United States Patent [19]

Asai et al.

[11] 3,897,484

[45] July 29, 1975

[54] MONO-ALANINE MALEATE

[75] Inventors: Soichiro Asai, Kawasaki; Hideo Tazuke, Tokyo; Hiroo Kageyama, Kamakura, all of Japan

[73] Assignee: Ajinomoto Co., Inc., Tokyo, Japan

[22] Filed: Mar. 30, 1972

[21] Appl. No.: 239,786

[52] U.S. Cl......... 260/501.11; 260/2 R; 260/534 C; 260/537 N
[51] Int. Cl.$^2$...................................... C07C 101/08
[58] Field of Search.................... 260/501.11, 534 C

[56] References Cited
UNITED STATES PATENTS
3,527,671  9/1970  Zenk et al................ 260/534 C X
3,527,776  9/1970  Uzuki et al................ 260/534 L X

OTHER PUBLICATIONS

Richter, Beilsteins Handbuch der Organischen Chemie, (1920-29), Vol. 4, p. 811, (1942).

Fitzgerald, Chemical Abstracts, Vol. 32, Col. 3758, (1938).

*Primary Examiner*—Joseph E. Evans
*Assistant Examiner*—G. Breitenstein
*Attorney, Agent, or Firm*—Hans Berman; Kurt Kelman

[57] ABSTRACT

DL-Alanine is optically resolved by making an aqueous solution of DL-alanine and of maleic acid supersaturated with respect to mono-alanine maleate, and seeding the supersaturated solution with crystals of an optically active enantiomorph of mono-alanine maleate. The grown crystals are recovered and decomposed to separate the optically active alanine moiety from the maleic acid moiety which may be recycled.

1 Claim, No Drawings

MONO-ALANINE MALEATE

This invention relates to the optical resolution of DL-alanine, and more specifically to the resolution of a derivative of DL-alanine which is readily formed and readily decomposed.

DL-Alanine is one of the amino acids which are capable of being synthesized at low cost, but the optically inactive synthetic product has little practical use whereas the optically active L-enantiomorph finds an expanding field of application in the production of polymers.

The known methods for optical resolution of synthetic alanine which are based on seeding of supersaturated solutions, on differences in the solubilities of diastereoisomeric salts with optically active acids and bases, and on biological processes are not well suited for operation on an industrial scale because of the high cost of the required materials and/or the complexity of the operations involved.

A primary object of the invention is the provision of a method of optically resolving DL-alanine which is simple and low in cost. Another object is the resolution of DL-alanine without loss of the amino acid and without the production of waste which would be difficult to dispose of.

It has been found that mono-DL-alanine maleate, the acid addition salt of equimolecular amounts of DL-alanine and maleic acid, is more soluble in water than the optically active enantiomorphs of mono-alanine maleate, and that the DL-form is a racemic mechanical mixture of the optically active forms. It is possible, therefore, to crystallize one or even both optically active forms from a supersaturated solution of the racemate by contact with seed crystals. The mono-alanine maleate in all its forms is readily decomposed for separate recovery of the alanine moiety and of the maleic acid moiety, and the latter may be returned to the resolution process to form additional mono-alanine maleate with DL-alanine.

Mono-alanine maleate is the only salt of alanine and maleic acid that can be precipitated from a supersaturated solution of the two acids. Even in the presence of a large excess of alanine, a di-alanine maleate could not be recovered in solid form from an aqueous solution.

The crystals of mono-alanine maleate are prismatic and grow very quickly. Because of their favorable volume-to-surface ratio, they absorb little of the mother liquor and can readily be obtained in a state of high purity. The infrared absorption spectra and X-ray powder spectra of the optically active forms and of the racemate are identical.

A solution of alanine and maleic acid supersaturated with respect to mono-alanine maleate is readily prepared by methods conventional in themselves, and all known techniques for optical resolution of racemates by seeding with an optically active enantiomorph are fully applicable.

A supersaturated solution of alanine and maleic acid may thus be prepared by cooling a saturated aqueous solution or by evaporating a portion of the water in the saturated solution, by partly neutralizing a solution of salts, by adding a common ion to a saturated solution, and in other ways known in the art.

Contact between the supersaturated solution and seed crystals of optically active mono-alanine maleate may be established by inoculating the solution with previously prepared crystals, by spontaneous crystallization of an unbalanced solution in which one enantiomorph prevails, or by simultaneous contact of the racemate solution with crystals of both optically active enantiomorphs which are of different size so as to be capable of subsequent separation by screening. The seed crystals and the racemate solution may be both stationary during contact, the seed crystals may be moved relative to the solution, the solution may be passed over a stationary bed of the seed crystals, or both the crystals and the solution may be agitated or flow continuously through equipment known in itself. The application of some of the basically known techniques of seeding and of recovering the grown seed crystals will be illustrated hereinbelow by specific examples.

The optically active enantiomorphs of mono-alanine maleate may be decomposed for separate recovery of the alanine and maleic acid moieties by means of ion exchange resins or by differential extraction with organic solvents. These known methods, however, while operative, are not well suited for industrial operation. Alanine is absorbed by commonly available ion exchange resins with relatively low efficiency, and organic solvents are costly and difficult to recover without serious loss.

It has now been found that the monosodium, monocalcium, hemicalcium, and monobarium salts of maleic acid are only sparingly soluble in aqueous solutions of suitable pH, and may thus be precipitated from solutions of the optically active mono-alanine maleates by the addition of the hydroxides of sodium, calcium, and barium or other sources of sodium, calcium, or barium ions at a pH at which these maleates in the solid state are stable in contact with the solution as will presently become apparent. The mother liquor yields optically active alanine most economically by crystallization at pH of approximately 7 to 8 after partial evaporation of the water, but other recovery methods may be resorted to in an obvious manner since the liquor is practially free of other compounds except small amounts of maleic acid or its salts.

In performing the decomposition of mono-alanine maleate by means of sodium hydroxide, the optically active crystals are suspended or dissolved in not more water than is needed to dissolve the liberated alanine at the prevailing temperature, and about one mole sodium hydroxide is added per mole of mono-alanine maleate to avoid formation of disodium maleate which is readily soluble in water and aqueous liquids. The monosodium maleate is precipitated in the form of its trihydrate and is readily converted to maleic acid in any desired manner if necessary. When the mother liquor is neutralized and partly evaporated, it yields crystalline, optically active alanine. Any maleic acid values in the mother liquor are converted to the disodium salt by the neutralization, and the liquid separated from the alanine crystals may be recycled to the decomposition step for forming monosodium maleate with the maleic acid in another batch of mono-alanine maleate.

Whe calcium hydroxide is employed for decomposing the crystals of optically active mono-alanine maleate, the crystals are dispersed or dissolved in an amount of water just sufficient to dissolve the alanine to be liberated, so that later evaporation of the water can be held to a minimum, and calcium hydroxide is added to the solution. The monocalcium salt, the hemicalcium salt of maleic acid, or a mixture of both is precipitated depending on the amount of calcium hydroxide employed. The hemicalcium salt is normally precipitated with 2.5 molecules of crystal water, and the monocalcium salt with one. The calcium salts may by decomposed to the free acid in any conventional manner. The monocalcium salt may be employed directly When for decomposing additional mono-alanine maleate to the hemicalcium salt and alanine which is crystallized from the liquor. The cycle is readily set up in such a manner that practically all alanine is recovered and practically all maleic acid is recycled, as will be shown in greater detail below.

The barium cycle is closely similar to the afore-described sodium or calcium cycles.

The following Examples further illustrate the invention, and it will be understood that the invention is not limited thereto.

EXAMPLE 1

A mixture of 62.4 g (0.7 mole) DL-alanine, 81.1 g (0.7 mole) maleic acid, and 70 ml water was heated to form a homogeneous solution which was then adjusted to 49°C and stirred while 10 g mono-L-alanine maleate in the form of crystals larger than 24 mesh was added. The mixture was cooled at a rate of 1°C per 10 minutes. When the temperature reached 47°C, 2 g mono-D-alanine maleate was added with continuing stirring in the form of a fine powder. Cooling was continued at the same rate to 30°C, and this temperature was maintained for about 1 hour until no further crystallization took place, the solution having become saturated.

The precipitated crystals were separated from the mother liquor, washed with methanol and ether, and then dried. They weighed 53 g and were fractionated by means of a 48 mesh screen. The retained crystals weighed 32.3 g and had a specific rotatory power $[\alpha]_D = +6.46°$ (C = 5, 1N HCl) corresponding to mono-L-alanine maleate 81.6% optically pure. The crystals passing through the screen weighed 20.6 g and were found to be mono-D-alanine maleate having an optical purity of 76.7%.

EXAMPLE 2

A saturated solution of mono-D-alanine maleate was prepared at 52°C and was stored in a tank at 60°C. The solution was drawn from the tank by gravity in a continuous stream through a cooling tube in which its temperature was reduced to 50°C, and further in two branch streams at a rate of 600 to 650 ml/minute through two columns maintained at 50°C and having each a diameter of 10 mm and a height of 1500 mm. The two streams discharged from the columns were mixed and pumped back into the storage tank.

Crystals of mono-D-alanine mealeate and mono-L-alanine maleate, 20–24 mesh, of 100% optical purity, were suspended in the respective columns in amounts of 10 g each. After 30 minutes of operation, a portion of the grown seed crystals was withdrawn from each column as a slurry and replaced by 5 g of fresh crystals. The crystals in each slurry were quickly drained of liquid on a 48 mesh screen, washed with ethanol and ether, and dried. The crystals of the L-form weighed 4.1 g, those of the D-form 3.7 g.

Partial withdrawal and replacement of seed crystals was repeated twice after 30 minute intervals, and the operation was stopped after a total elapsed time of two hours. All crystals were withdrawn from the two columns and washed and dried. The total amounts of recovered crystals were 46.2 g of 98% purity for the L-form, and 47.5 g of 97% purity for the D-form. When the added 25 g of seed crystals are taken into consideration, it is found that 20.3 g of the optically active L-enantiomorph and 21.0 of the D-enantiomorph were recovered from the racemate.

EXAMPLE 3

250 g Mono-L-alanine maleate prepared by the method of Example 2 was dissolved in 700 g water, and the solution was neutralized with 49 g sodium hydroxide at 30°C, whereby 187 g monosodium maleate trihydrate was precipitated. The mixture was filtered, the filtrate was adjusted to pH 7–8, and partly evaporated. The crystals of L-alanine formed were separated from the mother liquid and dried. They weighed 75 g (69% yield).

EXAMPLE 4

250 g Mono-L-alanine maleate (optical) purity 90%) were dissolved in 671 g water. A mixture of 7.5 g L-alanine, 9.0 g DL-alanine, 34.6 g disodium maleate, and 75 g water was added to the alanine solution, and thereafter 40 g sodium hydroxide. 220 g Monosodium maleate tri-hydrate was precipitated at 30°C. The mother liquor was adjusted to pH 7–8 with sodium hydroxide solution and further worked up as in Example 3 to recover 103.4 g L-alanine of 93% optical purity. The liquid from which the L-alanine crystals had been removed weighed 170 g. A 130 g portion of the liquid which contained 7.5 g L-alanine, 9.0 g DL-alanine, and 34.6 g disodium maleate, was added to another batch of 250 g mono-L-alanine maleate in 671 g water as above, and 40 g sodium hydroxide were added to start another cycle which was thereafter repeated several times without significant loss of maleic acid values and with practically complete recovery of the alanine values introduced into the process as mono-L-alanine maleate.

EXAMPLE 5

A solution of 250 g mono-L-alanine maleate in 660 g water was stirred with 90 g calcium hydroxide at 25°C to precipitate 190 g monocalcium maleate monohydrate of the formula $Ca(C_4H_2O_4).H_2O$. The mixture was filtered, 10 ml 35% hydrochloric acid was added to the filtrate which was thereafter partly evaporated to produce two crops of L-alanine crystals jointly weighing 99 g (91% yield).

EXAMPLE 6

250 g Mono-L-alanine maleate was dissolved in 700 g water, and 45 g calcium hydroxide was stirred into the solution at 20°C. Crystals of hemicalcium maleate 2.5-hydrate [$Ca(C_4H_3O_4)_2.5H_2O$] precipitated, were filtered off, and weighed 123 g when dry. The filtrate was stirred with 20 g additional calcium hydroxide at 25°C to precipitate 76 g monocalcium maleate monohydrate. The filtrate from the second precipitate was mixed with 9 ml concentrated hydrochloric acid and partly evaporated, whereby 95 g crystalline L-alanine was obtained.

EXAMPLE 7

250 g Mono-L-alanine maleate was dissolved in 700 g water, and 112 g $Ca(C_4H_2O_4).H_2O$ (monocalcium maleate) and 25.4 g calcium hydroxide were dissolved in the solution by heating and stirring. When the solution was cooled to 20°C, Ca(C$_4$H$_3$O$_4$)$_2$·0.5H$_2$O (hemicalcium maleate) was precipitated. The filtered and dried precipitate weighed 229 g.

The mother liquor (I) separated from the precipitate was mixed with a solution of 41 g hemicalcium maleate and 22 g L-alanine in 120 g water, and the mixture was stirred with 28.4 g calcium hydroxide at elevated temperature. The resulting solution was cooled to 25°C with stirring to precipitate 112 g monocalcium maleate which was recovered by filtering.

The mother liquor (II) was mixed with 23 g mono-L-alanine maleate, partly evaporated, and cooled to crystallize 119 g L-alanine. The mother liquor (III) from the alanine crystallization weighed 182 g.

Another batch of 250 g mono-L-alanine was dissolved in 700 g water, and the 112 g monocalcium maleate separated from mother liquor (II) and 25.4 g calcium hydroxide were dissolved in the solution by heating. When the solution was cooled, hemicalcium maleate crystallized and was recovered in an amount of 225 g by filtration. The filtrate was mixed hot with the 182 g mother liquor (III) and with 28.4 g calcium hydroxide. Upon cooling to 25°C with stirring, 115 g monocalcium maleate precipitated and was filtered off.

To the mother liquor (IV) which corresponded in its composition to the above liquor (II), 23 g mono-L-alanine was added, and the mixture was partly evaporated to induce crystallization of L-alanine which was recovered by filtration in an amount of 117 g.

A new cycle then could begin, almost the entire alanine originally present as mono-L-alanine having been recovered and most of the maleic acid moiety having been converted to the calcium salt which could readily be converted to the free acid as far as it was not employed for decomposing additional mono-L-alanine maleate.

EXAMPLE 8

205 g Mono-D-alanine maleate was dissolved in 380 g water, and 315 g barium hydroxide octahydrate was gradually stirred into the solution at 40°C. Upon cooling to 25°C with stirring, a precipitate of crystalline monobarium maleate monohydrate [Ba(C$_4$H$_2$O$_4$)·H$_2$O] was formed and filtered off, weighing 266 g. The mother liquor was mixed with 3 ml concentrated hydrochloric acid and partly evaporated to crystallize D-alanine which, when filtered off and dried, weighed 67 g. Upon further evaporation of the mother liquor, an additional 17 g D-alanine was recovered. The total recovery of maleic acid was 98.5% in the form of the barium salt, and 94.5% of the initially present D-alanine was recovered in crystalline form.

As is partly evident from Example 8, L-alanine and D-alanine and their respective maleates are interchangeable in the procedures described in the several Examples.

While the invention has been described with particular reference to specific embodiments, it is to be understood that it is not limited thereto, but is to be construed broadly and restricted solely by the scope of the appended claims.

What is claimed is:

1. Mono-alanine maleate.

* * * * *